United States Patent [19]

Kikuchi

[11] Patent Number: 4,717,831
[45] Date of Patent: Jan. 5, 1988

[54] OCEAN AND RIVER POWER GENERATOR

[76] Inventor: Naomi Kikuchi, 206 Kamiyachi, Niigata 951, Japan

[21] Appl. No.: 831,826

[22] Filed: Feb. 24, 1986

[51] Int. Cl.⁴ ............................................. F03B 13/10
[52] U.S. Cl. .......................................... 290/53; 290/54
[58] Field of Search ...................... 290/42, 43, 53, 54; 415/2 R, 3 R, 4 R

[56] References Cited

U.S. PATENT DOCUMENTS

| | | | |
|---|---|---|---|
| 1,413,411 | 4/1922 | Lloyd et al. | 415/3 R |
| 2,059,356 | 11/1936 | James | 415/2 R |
| 2,097,286 | 10/1937 | McGee | 290/54 |
| 3,746,875 | 7/1973 | Donatelli | 290/54 X |
| 3,986,786 | 10/1976 | Sellman | 415/2 R |
| 3,993,913 | 11/1976 | Dickman | 290/53 |
| 4,001,596 | 1/1977 | Kurtzbein | 290/53 |
| 4,034,231 | 7/1977 | Conn et al. | 290/53 |
| 4,039,847 | 8/1977 | Diggs | 290/53 X |
| 4,053,787 | 10/1977 | Diggs | 290/54 |
| 4,137,005 | 1/1979 | Comstock | 415/2 R |
| 4,241,283 | 12/1980 | Storer, Sr. | 290/54 |
| 4,301,377 | 11/1981 | Rydz | 290/54 X |
| 4,317,330 | 3/1982 | Brankovics | 290/54 X |

FOREIGN PATENT DOCUMENTS 0046072 3/1982 Japan ....................... 290/43

Primary Examiner—William M. Shoop, Jr.
Assistant Examiner—Sharon D. Logan

[57] ABSTRACT

An ocean and river water power generator has a plurality of water wheel power generators. Said water wheel power generator includes a common concrete base, a water wheel having a main shaft thereof and a plurality of water wheel impellers fixedly and radially attached to said main shaft for transforming potential energy of water in the ocean or a river to rotational energy thereof, a speed-up gear means having an input shaft thereof connected with one end of said main shaft for increasing the number of RPM of the main shaft for increasing said rotational energy.

1 Claim, 12 Drawing Figures

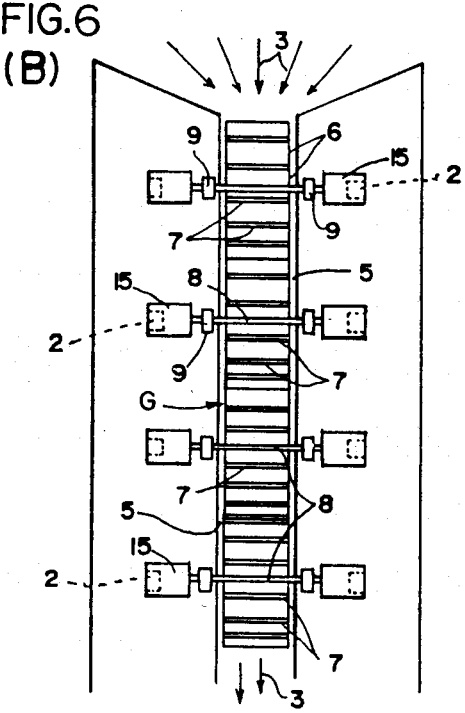
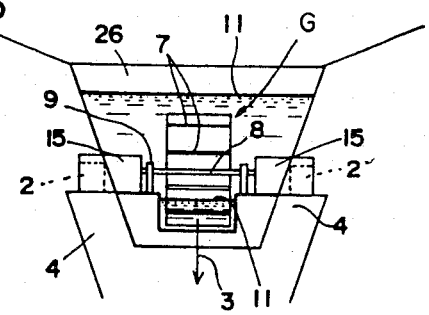
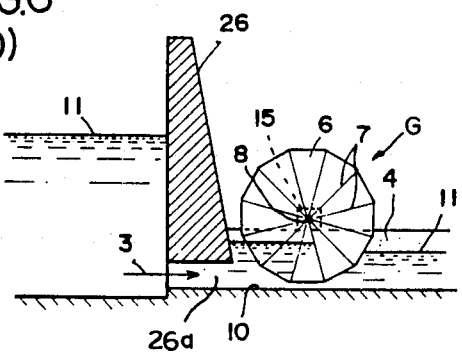
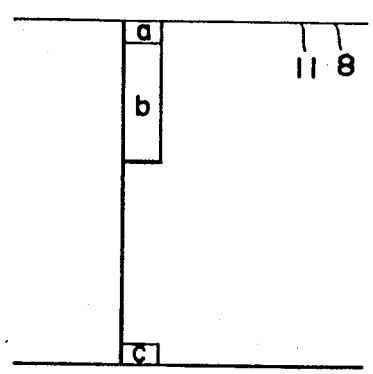
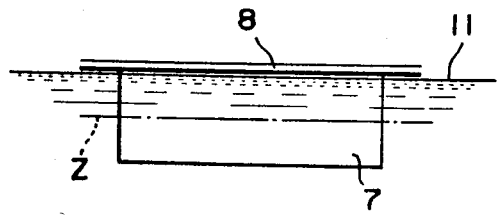

OCEAN AND RIVER POWER GENERATOR

BACKGROUND OF THE INVENTION

1. Field of the Invention:

The present invention relates to an ocean and river water power generator for transforming potential energy of the stream of the water in the ocean or a river to rotational energy thereof and further converting the rotational energy to electric energy by making use of generators.

2. Description of the Prior Art:

Conventionally, an ocean and river water power generator of this type is known, which generates electricity by profitably employing the change of an ocean current caused by the tide on the turn as well a head of the river stream. Such a water power station generates electricity of for example about 200 thousands kW by constructing a big dam having a head of about 100 m. However, such a massive water power station requires several years for its construction at an enormous cost.

By contrast, U.S. Pat. No. 392,349 discloses another type of water power system capable of generating electricity with a low head. The water power system eliminates cavitation to reduce energy loss. However, such a low head water power only generates a small amount of electricity ranging from about several tens to several hundreds of kW, which is useful for private communities but useless for an urban area as a power source.

SUMMARY OF THE INVENTION

In view of the drawbacks with the conventional water power station, it is an object of the present invention to provide a plurality of power stations of small size for shortening the period of construction thereof as well as reducing the cost thereof.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIG. 7(A) is a schematic showing a dam and the depth of water at which one end of a water wheel is located, and FIG. 7(B) is a front view showing average water pressure applied to a water wheel impeller.

DESCRIPTION OF THE PREFERRED EMBODIMENTS

Figure 1:
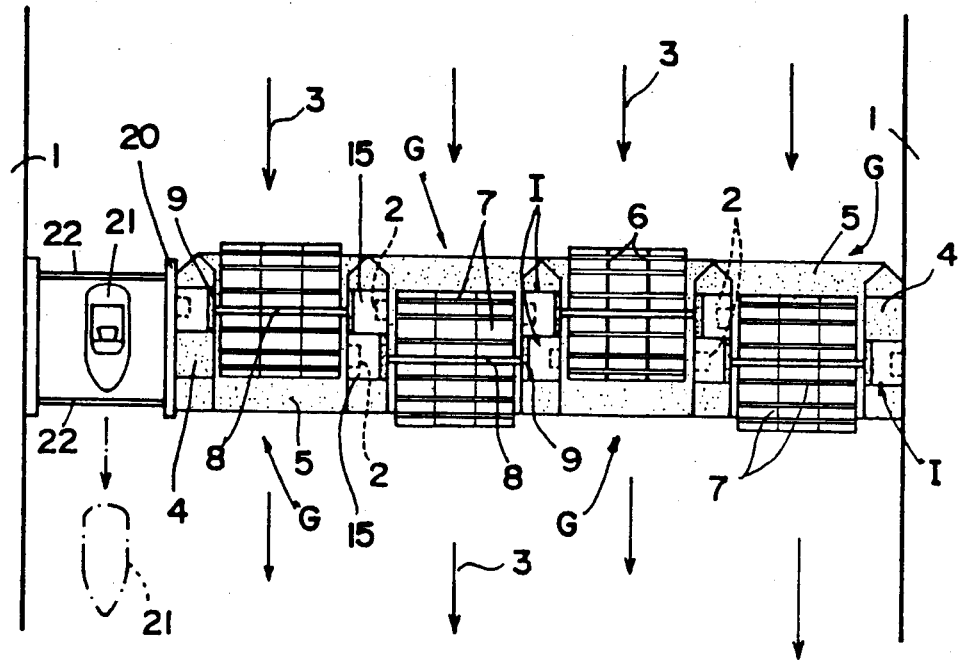
FIG. 1 is a plan view showing a first embodiment of an ocean and river water power generator according to the present invention.

In FIGS. 1 to 4 illustrating a first embodiment according to the present invention, a plurality of water power generatos G are installed side by side in the width direction of a river. The water power generators G have a common concrete base 5 provided on the bottom of the river, which base 5 has a common concrete base 4 provided thereon spaced in a prescribed interval for water power generators 2 while projecting above the surface of the water. A floodgate 22 through which a boat 21 passes is provided on one side wall 20 of the concrete base 5. Denoted at 1 is a bank of the river or the seashore.

Figure 2:
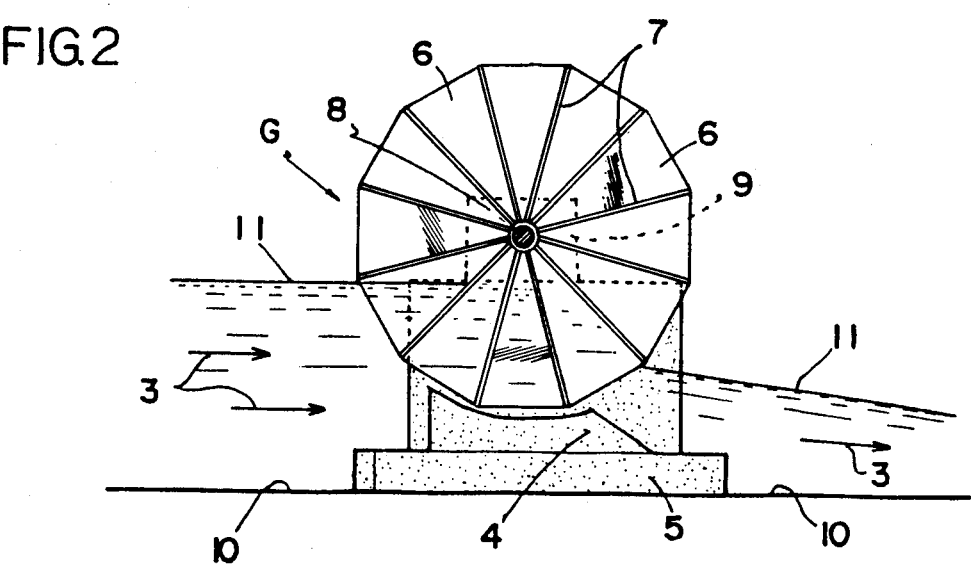
FIG. 2 is a side elevational view of the ocean and river water power generation of FIG. 1.
Figure 3:
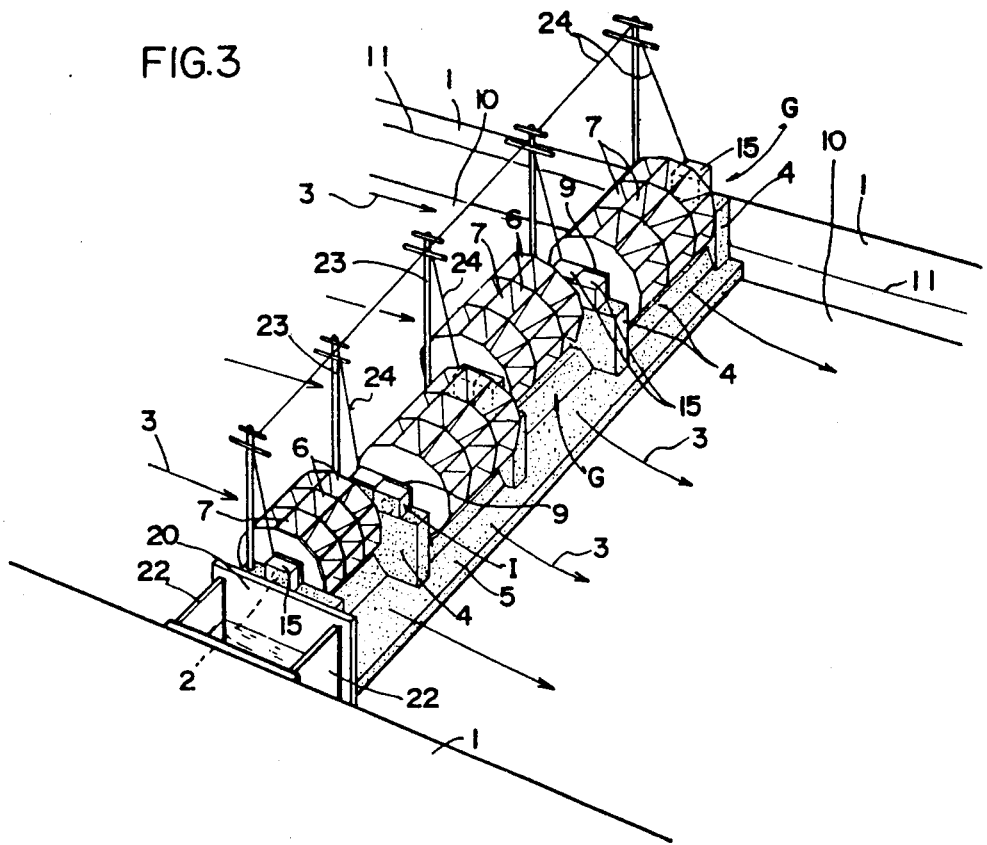
FIG. 3 is a perspective view of the same.
Figure 4:
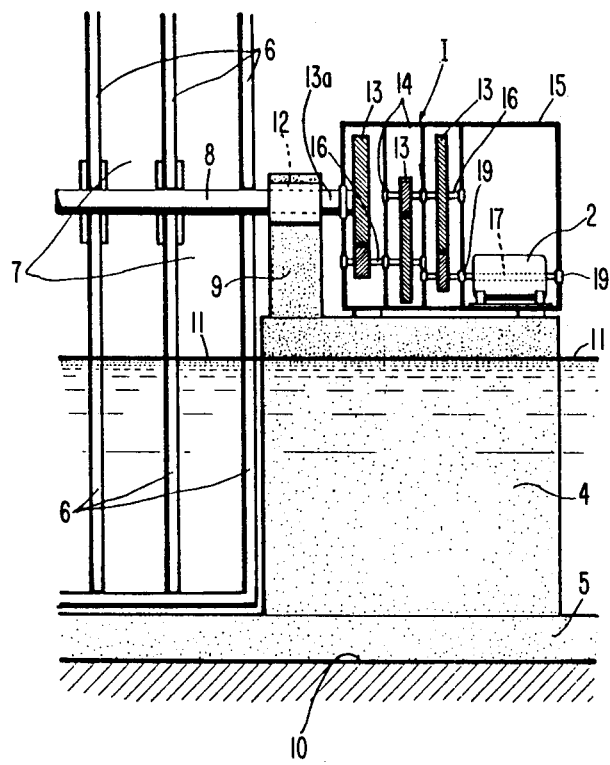
FIG. 4 is a longitudinal sectional view of the same.

In addition, a mains haft 8 of the water wheel W is supported on the concrete base 4. The main shaft 8 is located above the surface 11 of the water while supported at its ends on a water wheel concrete support 9 provided while standing upright on the concrete base 4. As illustrated in FIGS. 2 and 3, the concrete base is downwardly inclined toward a concave arched portion to leave a narrow water-flow gap between the water wheel and the concrete base. A plurality of water wheel impellers 7 are fixedly and radially mounted on the main shaft 8. The impellers 7 are respectively fixedly monted on steel frames 6 radially attached to the main shaft 8.

One end of the main shaft 8 is supported on a bearing 12 while connected with an input shaft 13a of a speed-up gear means I. The speed-up gear means I has a plurality of gear stages 13 housed in a casing 15, each of whose shafts 16 is supported on a bearing 14, and has an output shaft 19 connected with a drive shaft 17 of the power generator 2. Electricity power generated by a plurality of the power generators 2 is transmitted through an electric wire 24 of one system stretched around poles 23.

With the water wheel impellers 7 rotated by a relatively slow stream of water 3, rotational force so produced is transmitted to the main shaft 8. The rotation of the main shaft 8 is increased in its RPM by the speed-up gear means I and outputted to rotate the drive shaft 17 of the power generator 2 for generating electricity.

Electric powers so generated by the respecrtive water power generators G are added to each other and transmitted through the electric wire 24.

As described above, the main shaft 8 and the drive shaft 17 are coupled with each other via the speed-up gear means I whereby the rotation of the main shaft 8 for example 50 RPM can cause that of the drive shaft 17 of 300 RPM for excellent power generation.

In addition, since a plurality of water wheel power generators G are installed side by side in the river stream, very big electric power can be generated by adding the generated powers from the respective gnerators G to each other.

Figure 5:
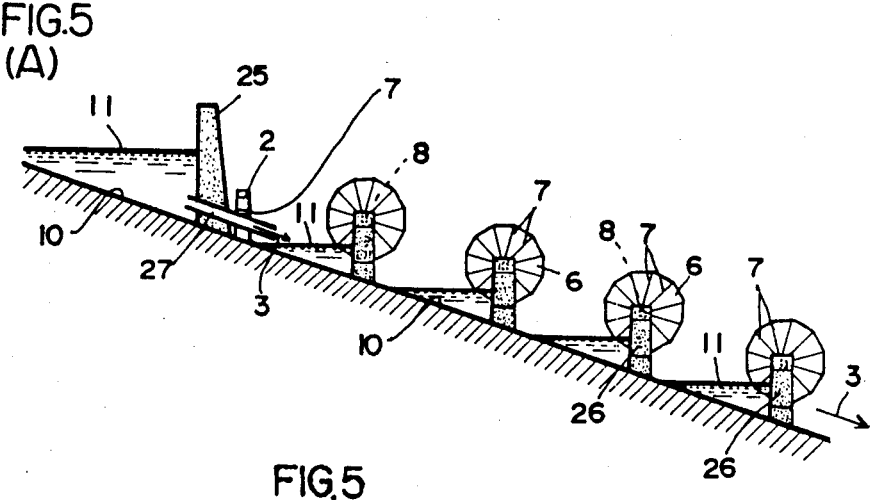
FIG. 5(A) is a side elevational view of a second embodiment of the ocean and river water power generator according to the present invention.
FIG. 5(B) is a front view showing the same.
Figure 5:
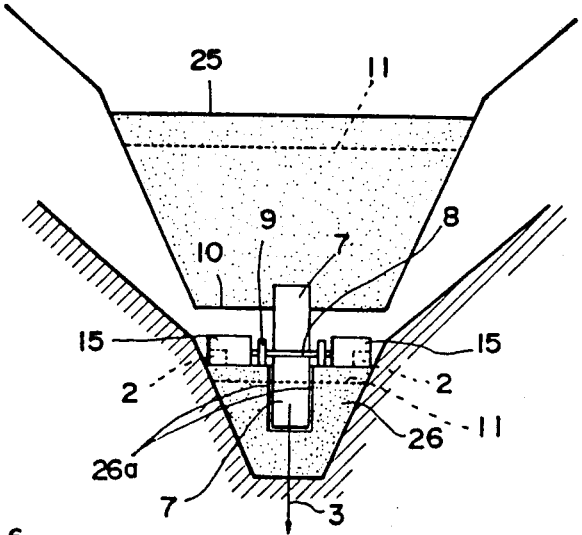

Then, referring to FIG. 5, a second embodiment of an ocean and river water power generator according to the present invention well be described. In the figure,t he same symbols shall be appleid to portions having the same functions as those of the first embodiment, and detailed description thereof is neglected here.

In this embodiment, water wheel generators G are installed in parallel to the stream of a river. Small dams 26 are installed downsteam of a upstream dam 25 while spaced in a porper interval. Each of these small dams 26 has a notched outlet 26a, formed in its upper part, in which a lower part of the water wheel impeller 7 is movably disposed.

Therefore, the water wheel generator G provided at the dam 25 generated electricity by making use of water jetting from a water supply pipe 27 located at the upstream dam 25, while each of the water wheel impellers 7 successively provided at the small dams 26 is rotated owing to the water flowing out from the generator G, and the rotation of the water wheel impeller 7 is increased through the speed-up gear means I to drive the drive shaft 17 of the power generator 2 for generating electricity.

Figure 6:
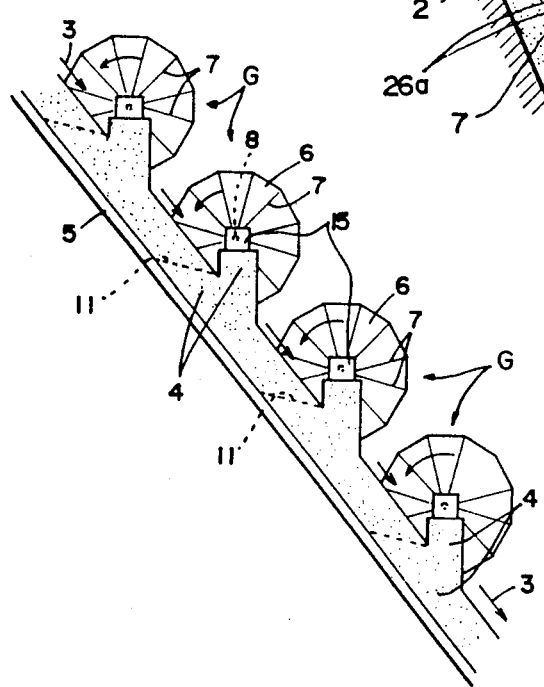
FIG. 6(A) is a side view showing a third embodiment of the ocean and river water power generator according to the present invention.
FIG. 6(B) is a plan view showing the same.
FIG. 6(C) is a front view showing the same.
FIG. 6(D) is a cross sectional view showing the same.

Moreover, a third embodiment of an ocean and river water power generator according to the present invention will be described with reference to FIG. 6. In the figure, the same symbols shall be applied to portions having the same functions as those of the first embodiment, and detailed description thereof is neglected here.

A stream port 26a is provided on the lower part of the small dam 26 while the lower part of the water wheel impeller 7 is located in the stream inlet 26a, and a plurality of the water wheel generators G are installed along the stream direction.

Therefore, the water wheel impeller 7 is rotated owing to water jetting from the stream port 26a of the water wheel generator G, and the rotation is increased by the speed-up gear means I for generating electricity by the generator 2.

Furthermore, although, in the embodiments described above, power generation by making use of the river stream was illustrated, various modifications may be profitably employed. For example, water wheel generators G may be transversally arranged side by side along an inlet of the ocean or a breakwater, and the water wheel impeller 7 may be rotated for generating electricity by making use of the difference between the rise and fall of the tide.

Then, characteristics of the water power generator coil be described with reference to FIG. 7. In the figure, water wheel impellers a, b concern the present invention, while a water wheel impeller c a prior one, a takes the dimension of 2 m in width and 2 m in height and b 2 m in width and 10 m in height, while c is located at the depth of a dam of 100 m as usual having the dimension of 2 m in width and 2 m in height.

Then, the amount of the power so generated will be described.

[generated power]=[rotational force of the main shaft 8]=[stream power to the water wheel impeller 7]×[length from the main shaft 8 to the lower end of the water wheel impeller 7]×[flow rate], But, in the above expression, [steam power]=[average hydraulic pressure]×[area of the water wheel impeller].

Thus, generated powers Pa to Pc in a to c are as follows:

$$Pa = 1 \times 4 \times 2 \times Q = 8Q$$

$$Pb = 5 \times 20 \times 10 \times Q = 1000Q$$

$$Pc = 99 \times 4 \times 2 \times Q = 792Q$$

Here, Q is a prescribed flow rate of water, and the average hydraulic pressure is given by a portion shown in FIG. 7 (B).

Accordingly, a ratio of the generated powers of b and c is 1000:792, and so the prior dam having the depth of water of 100 m is substantially equal in generated power to the water wheel dam of the depth of water of 100 m.

In addition, another evaluation must be done provided that the surface of the water (11) is lower than the main shaft (8), and the flow rate of water Q in the above expression is the same in case of the same river.

As described above, generated power by the prior dam is proportional to an available head, while those of the water wheel dams a, b are proportional to the square of the length of the dam in question, proportional to the cube of the available head.

Although certain preferred embodiments hve been shown and described, it should be understood that many changes and modifications may be made therein without departing from the scope of the appended claims.

What is claimed is:

1. An ocean and river water power generator composed of a plurality of water wheel power generators, said water wheel power generator comprising:
    (a) a common concrete base having an upstream inlet end and a downstream concave arched portion, said inlet end being inclined downwwardly toward said arched portion,
    (b) a water wheel disposed above said inlet end and said concave arched portion, said water wheel including a main shaft and a plurality of water wheel impellers fixedly and radially attached to said main shaft for transforming potential energy of water in the ocean or a river to rotation energy thereof, said concave arched portion of the conrete base disposed beneath the main shaft of said water wheel, said water wheel having a plurality of radially extending plate frames connected to side edges of said water wheel impellers and at spaced apart intervals therebetween, said plate frames and said water wheel impellers being substantially radially coextensive,
    (c) a speed-up gear means having an input shaft thereof connected with one end of said main shaft for increasing the number of RPM of the main shaft for increasing said rotation energy, said speed-up gear means having an output shaft, and
    (d) a plurality of power generators connected with the output shaft of said speed-up gear means for generating electricity.

* * * * *

UNITED STATES PATENT AND TRADEMARK OFFICE
CERTIFICATE OF CORRECTION

PATENT NO. : 4,717,831

DATED : January 5, 1988

INVENTOR(S) : Naomi Kikuchi

It is certified that error appears in the above—identified patent and that said Letters Patent is hereby corrected as shown below:

Column 2, line 16, "a mains haft 8" should read - -a main shaft 8-

Column 2, line 26, "are respectively fixedly monted" should read - -are respectively fixedly mounted- -.

Column 2, line 44, "by the respecrtive" should read - -by the respective- -.

Column 2, lines 60-61, "In the figure,t he same" should read - -In the figure, the same- -.

Column 2, line 61, "shall be appleid" should read - -shall be applied- -.

Column 2, line 67, "in a porper interval." should read - -in a proper interval.- -.

Column 3, line 41, "a prior one, a takes" should read - -a prior one. A takes- -.

Column 3, line 44, "having the dimension" should read - -having the dimensions- -.

Column 4, line 23, "preferred embodiments hve been" should read - -preferred embodiments have been- -.

UNITED STATES PATENT AND TRADEMARK OFFICE
CERTIFICATE OF CORRECTION

PATENT NO. : 4,717,831
DATED : January 5, 1988
INVENTOR(S) : Naomi Kikuchi

It is certified that error appears in the above-identified patent and that said Letters Patent is hereby corrected as shown below:

Claim 1, column 4, line 33, "being inclined downwwardly" should read
-- being inclined downwardly --.

Signed and Sealed this

Nineteenth Day of July, 1988

Attest:

DONALD J. QUIGG

Attesting Officer         Commissioner of Patents and Trademarks